United States Patent
Wen et al.

(10) Patent No.: US 10,191,717 B2
(45) Date of Patent: Jan. 29, 2019

(54) METHOD AND APPARATUS FOR TRIGGERING EXECUTION OF OPERATION INSTRUCTION

(71) Applicant: XIAOMI INC., Beijing (CN)

(72) Inventors: Hong Wen, Beijing (CN); Hui Li, Beijing (CN); Baishu Liao, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 15/647,310

(22) Filed: Jul. 12, 2017

(65) Prior Publication Data

US 2017/0308353 A1  Oct. 26, 2017

Related U.S. Application Data

(63) Continuation of application No. PCT/CN2015/093407, filed on Oct. 30, 2015.

(30) Foreign Application Priority Data

Jan. 15, 2015 (CN) ............ 2015 1 0020749

(51) Int. Cl.
  *H04M 1/725* (2006.01)
  *G06F 3/16* (2006.01)
  (Continued)

(52) U.S. Cl.
  CPC ............ *G06F 3/167* (2013.01); *G06F 3/0488* (2013.01); *G10L 15/22* (2013.01);
  (Continued)

(58) Field of Classification Search
  CPC ........... G06F 1/1684; G06F 2200/1636; G06F 1/1694; G06F 2200/1637; G06F 3/017;
  (Continued)

(56) References Cited

U.S. PATENT DOCUMENTS

| | | | |
|---|---|---|---|
| 7,570,769 B2 * | 8/2009 | Garcia | H04R 29/001 381/58 |
| 7,966,084 B2 * | 6/2011 | Bengtsson | G06F 1/1626 340/540 |

(Continued)

FOREIGN PATENT DOCUMENTS

| | | |
|---|---|---|
| CN | 102316208 A | 1/2012 |
| CN | 103761984 A | 4/2014 |

(Continued)

OTHER PUBLICATIONS

Office Action dated May 16, 2017 in Japanese Patent Application No. 2016-545289 (with unedited computer generated English translation).

(Continued)

*Primary Examiner* — Duc Nguyen
*Assistant Examiner* — Kile O Blair
(74) *Attorney, Agent, or Firm* — Oblon, McClelland, Maier & Neustadt, L.L.P.

(57) ABSTRACT

The disclosure relates to a method, apparatus, and non-transitory computer-readable medium for triggering an execution of an operation instruction. The method includes detecting a first electrical signal generated on a signal line connected to a speaker of a device; determining that the first electrical signal includes a first signal characteristic that corresponds to one of a plurality of signal characteristics, wherein each one of the plurality of signal characteristics corresponds to a respective one of a plurality of operations; executing a first operation from the plurality of operations based on the first signal characteristic.

9 Claims, 4 Drawing Sheets

(51) Int. Cl.
*G06F 3/0488* (2013.01)
*G10L 15/22* (2006.01)

(52) U.S. Cl.
CPC ... *H04M 1/72569* (2013.01); *G10L 2015/223* (2013.01); *H04R 2400/01* (2013.01)

(58) Field of Classification Search
CPC .. G06F 3/0436; G06F 3/167; H04M 1/72569; H04R 2400/01
See application file for complete search history.

(56) References Cited

U.S. PATENT DOCUMENTS

| | | | |
|---|---|---|---|
| 8,345,886 B2* | 1/2013 | Park | H04R 29/001 381/59 |
| 9,240,182 B2* | 1/2016 | Lee | G10L 15/20 |
| 9,736,782 B2* | 8/2017 | Nilsson | H04W 52/0254 |
| 2005/0238180 A1* | 10/2005 | Chen | G10K 11/178 381/71.6 |
| 2011/0237230 A1 | 9/2011 | Li et al. | |
| 2012/0089952 A1* | 4/2012 | Song | G06F 1/1684 715/863 |
| 2015/0081296 A1* | 3/2015 | Lee | G10L 15/20 704/239 |
| 2015/0189410 A1* | 7/2015 | Oh | G10L 17/22 381/110 |

FOREIGN PATENT DOCUMENTS

| | | | |
|---|---|---|---|
| CN | 103780757 A | | 5/2014 |
| CN | 104657072 A | | 5/2015 |
| JP | 60-241096 A | | 11/1985 |
| JP | 11-53103 A | | 2/1999 |
| JP | 2004-334740 A | | 11/2004 |
| JP | 2009-143454 A | | 7/2009 |
| KR | 20130072562 A | * | 7/2013 |
| KR | 10-1480655 B1 | | 1/2015 |
| RU | 2 504 821 C2 | | 1/2014 |

OTHER PUBLICATIONS

Office Action dated Sep. 12, 2017 in Japanese Patent Application No. 2016-545289 (with unedited computer generated English translation).

Office Action dated May 3, 2017 in Chinese Patent Application No. 201510020749.7 (with unedited computer generated English translation).

International Search Report and Written Opinion dated Jan. 29, 2016 in PCT/CN2015/093407 (with English language translation).

Combined Office Action and Search Report dated Jan. 22, 2018 in Russian Patent Application No. 2016149323.

* cited by examiner

METHOD AND APPARATUS FOR TRIGGERING EXECUTION OF OPERATION INSTRUCTION

CROSS-REFERENCE TO RELATED APPLICATIONS

This application is a Continuation of International Application No. PCT/CN2015/093407, filed Oct. 30, 2015, which is based upon and claims priority to Chinese Patent Application Serial No. 201510020749.7, filed on Jan. 15, 2015, the entire contents of which are incorporated herein by reference.

TECHNICAL FIELD

The present disclosure generally relates to a computer technology field, and more particularly, to a method and an apparatus for triggering an execution of an operation instruction.

BACKGROUND

With the rapid development of the communication technology and computer technology, the mobile terminal (such as a mobile phone) has been popularized, and has become an essential element in people's daily life. The mobile terminal has various functions which may be realized by executing different operation instructions.

Generally, a frequently-used approach for triggering an execution of an operation instruction refers to a touch operation on the touch screen. However, the disadvantage of such an approach is that it works only in a screen displaying state. In addition, there is another frequently-used approach for triggering an execution of an operation instruction which refers to pressing physical keys disposed on the terminal.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for triggering execution of operation instructions. The method includes detecting a first electrical signal generated on a signal line connected to a speaker of a device; determining that the first electrical signal includes a first signal characteristic that corresponds to one of a plurality of signal characteristics, wherein each one of the plurality of signal characteristics corresponds to a respective one of a plurality of operations; executing a first operation from the plurality of operations based on the first signal characteristic.

When detecting the first electrical signal while the speaker is outputting an audio, the first signal characteristic includes a signal characteristic associated with the device being in a small confined space, and the first operation includes an operation of increasing a volume of the speaker or a volume associated with a ringtone.

The plurality of signal characteristics includes at least one of (i) a signal characteristic of the device being clicked or tapped, (ii) a signal characteristic of the device being continuously clicked or tapped, and (iii) a signal characteristic of the device being moved in a reciprocating manner.

The plurality of operations includes at least one of (i) an operation of screen unlock, (ii) an operation of answering a call, and (iii) an operation of starting a camera function.

When detecting the first electrical signal, the method includes detecting a voltage signal and a current signal generated on the signal line.

Aspects of the disclosure also provide an apparatus including a speaker; a processor; and a memory for storing instructions executable by the processor. The processor is configured to detect a first electrical signal generated on a signal line connected to the speaker; determine that the first electrical signal includes a first signal characteristic that corresponds to one of a plurality of signal characteristics, wherein each one of the plurality of signal characteristics corresponds to a respective one of a plurality of operations; and execute a first operation from the plurality of operations based on the first signal characteristic.

The processor is also configured to detect the first electrical signal while the speaker is outputting an audio, wherein the first signal characteristic includes a signal characteristic associated with the device being in a small confined space, and wherein the first operation includes an operation of increasing a volume of the speaker.

The plurality of signal characteristics includes at least one of (i) a signal characteristic of a click, (ii) a signal characteristic of a continuous number of clicks or taps, (iii) a signal characteristic of a reciprocating movement.

The plurality of operations includes at least one of (i) an operation of screen unlock, (ii) an operation of answering a call, and (iii) an operation of starting a camera function.

The processor is also configured to detect the first electrical signal by detecting a voltage signal and a current signal generated on the signal line.

Aspects of the disclosure also provide a non-transitory computer-readable storage medium having stored therein instructions that, when executed by a processor of a device, cause the processor to perform a method including detecting a first electrical signal generated on a signal line connected to a speaker of the device; determining that the first electrical signal includes a first signal characteristic that corresponds to one of a plurality of signal characteristics, wherein each one of the plurality of signal characteristics corresponds to a respective one of a plurality of operations; and executing a first operation from the plurality of operations based on the first signal characteristic.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but serve to explain the concept of the present disclosure to those skilled in the art via reference to specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Aspect One

Figure 1:
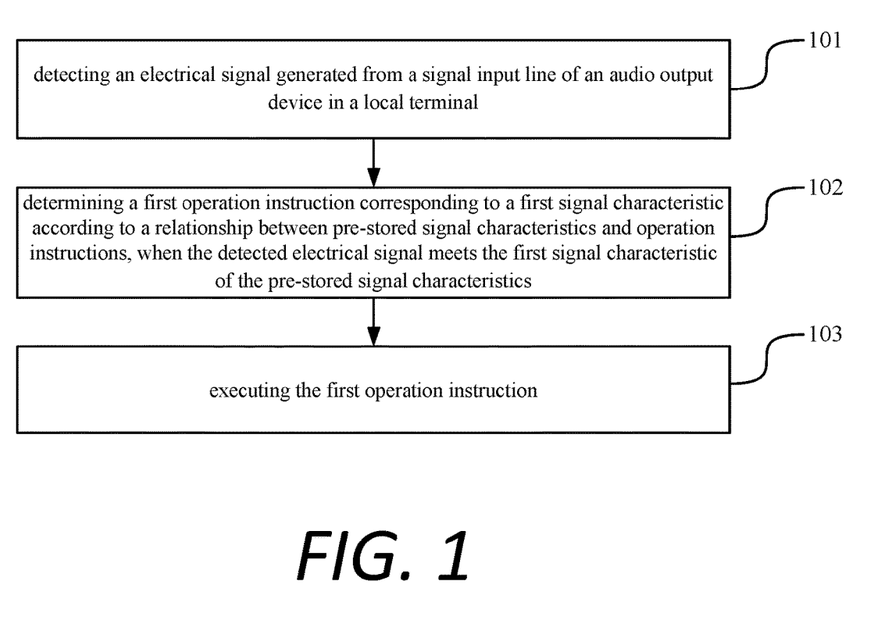
FIG. 1 is a flow chart showing a method for triggering an execution of an operation instruction, according to an exemplary aspect of the present disclosure.

The aspect of the present disclosure provides a method for triggering an execution of an operation instruction. As shown in FIG. 1, a processing flow of the method may include the following steps.

In step 101, an electrical signal generated from a signal input line of an audio output device in a local terminal is detected.

In step 102, a first operation instruction corresponding to a first signal characteristic is determined according to a relationship between pre-stored signal characteristics and operation instructions, when the detected electrical signal meets the first signal characteristic of the pre-stored signal characteristics.

In step 103, the first operation instruction is executed.

In the aspect of the present disclosure, the electrical signal generated from the signal input line of the audio output device in the local terminal is detected, when the detected electrical signal meets the first signal characteristic of the pre-stored signal characteristics, the first operation instruction corresponding to the first signal characteristic is determined according to the relationship between the pre-stored signal characteristics and the operation instructions, and the first operation instruction is executed. In this way, an execution of a corresponding operation instruction may be triggered based on a characteristic of the electrical signal generated from the signal input line of the audio output device caused by a user operation or a state of the terminal. Thus, whether or not the screen is in a displaying state, the execution of the operation instruction may be triggered. Moreover, varied and abundant approaches for triggering the execution of the operation instruction are provided besides physical keys, which may increase a flexibility of triggering the execution of the operation instruction.

Aspect Two

The aspect of the present disclosure provides a method for triggering an execution of an operation instruction. The method may be used in a terminal, such as a mobile terminal (e.g., a mobile phone, a tablet computer). In this aspect, the mobile terminal is taken as an example of an executing body for illustrating the solution in detail. Other similar cases shall not be described in detail herein.

The processing flow shown in FIG. 1 will be described in detail combined with aspects.

In step 101, an electrical signal generated from a signal input line of an audio output device in a local terminal is detected.

In implementation, the mobile terminal may be provided with the audio output device, such as a speaker. The audio output device may be installed at a bottom, a top or a back of the terminal. Inside of the mobile terminal, an audio processing chip may be connected with an analog-to-digital converter, the analog-to-digital converter is connected with a power amplifier, and the power amplifier is connected with a signal input terminal of the audio output device. A line between the power amplifier and the audio output device is the signal input line of the audio output device, from which the electrical signal may be detected. The electrical signal may include a voltage signal and a current signal.

When being received by the audio output device, an output signal may generate an electromagnetic field in the audio output device, and the electromagnetic field enables a diaphragm in the audio output device to vibrate, thus making a sound. In contrary, when the mobile terminal moves, for example, the terminal is shaken or clicked by the user, the diaphragm in the audio output device may vibrate and accordingly generates the electromagnetic field, thus generating the electrical signal on the signal input line of the audio output device. Even the audio output device is not in a working state, when the mobile terminal vibrates, the electrical signal may be generated from the signal input line of the audio output device based on a principle described above.

Figure 2:
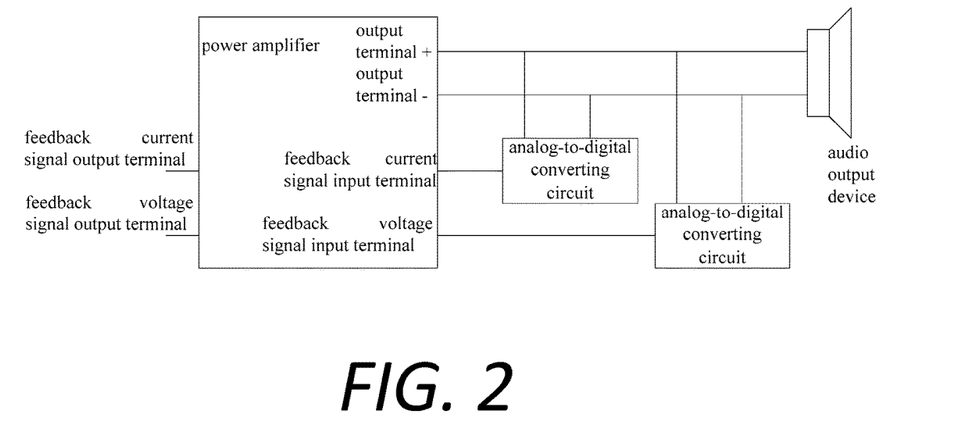
FIG. 2 is a schematic diagram illustrating a circuit, according to an exemplary aspect of the present disclosure.

A structure of the power amplifier may be as shown in FIG. 2, which has an additional feedback signal input terminal and an additional feedback signal output terminal compared with an ordinary power amplifier. The feedback signal input terminal is configured to obtain the electrical signal from the signal input line of the audio output device. An analog-to-digital converting circuit may be arranged either outside or inside of the power amplifier, and is configured to convert the electrical signal on the signal input line from an analog signal into a digital signal. The feedback signal output terminal may be connected with a central processor of the mobile terminal, and is configured to send the converted digital signal to the central processor for a subsequent processing. The feedback signal input terminal may also include a feedback current signal input terminal and a feedback voltage signal input terminal, and the feedback signal output terminal may also include a feedback current signal output terminal and a feedback voltage signal output terminal.

Alternatively, step 101 may include: detecting the electrical signal generated from the signal input line of the audio output device while the audio output device in the local terminal is outputting an audio.

In implementation, while the audio output device in the local terminal is outputting the audio, a change of a circumstance where the mobile terminal is located may influence the vibration of the diaphragm, such that a variation occurs in the electrical signal from the signal input line of the audio output device. For example, when the mobile terminal is in a close circumstance, such as in a bag or a pocket, if a ring is played via the speaker, a surrounding forms a reflection for the ring, and a strength of a reflected sound wave is relatively larger, such that the reflected sound wave greatly influences the vibration of the diaphragm of the speaker, and thus influences the electrical signal from the signal input line of the audio output device. In this case, the electrical signal from the signal input line is distinct from an actual output signal transmitted to the audio output device, and is also distinct from the electrical signal from the signal input line when the mobile terminal is in an open circumstance. Therefore, the electrical signal generated from the signal input line of the audio output device is detected for a subsequent analysis, while the audio output device in the local terminal is outputting an audio. The specific detecting method may refer to a related content above.

In step 102, a first operation instruction corresponding to a first signal characteristic is determined according to a relationship between pre-stored signal characteristics and operation instructions, when the detected electrical signal meets the first signal characteristic of the pre-stored signal characteristics.

In implementation, different signal characteristics corresponding to different operations may be stored in a server. In order to determine a signal characteristic corresponding to a certain operation, a movement of the mobile terminal caused by the operation may be analyzed, a vibration characteristic of the diaphragm in the audio output device during the movement may be thus analyzed, and a signal characteristic of the electrical signal generated from the signal input line of the audio output device caused by the vibration characteristic may be further analyzed. For example, a click operation causes a movement of the mobile terminal with a predictable amplitude and frequency scope, the amplitude and frequency scope of the vibration of the diaphragm may be thus determined, and the signal characteristic of the electrical signal generated from the signal input line of the audio output device caused by the vibration of the diaphragm may be further determined. In order to determine a signal characteristic corresponding to a certain circumstance where the mobile terminal is located, a vibration characteristic of the diaphragm when the mobile terminal is outputting an audio in the circumstance is analyzed, and the signal characteristic of the electrical signal generated from the signal input line of the audio output device caused by the vibration characteristic may be further analyzed.

Alternatively, an experimentation may be applied to determine the signal characteristic corresponding to a certain operation or circumstance. While a corresponding operation is performed or the mobile terminal is in a corresponding circumstance, the electrical signal generated from the signal input line of the audio output device is detected, parameter characteristics of the electrical signal corresponding to a large number of experiments are recorded, the signal characteristic corresponding to the corresponding operation is thus determined, or the signal characteristic corresponding to the corresponding circumstance where the mobile terminal is located is thus determined.

Moreover, different operations and/or different circumstances may be provided with operation instructions which the operations and/or circumstances trigger. For example, an operation instruction triggered by a click operation may be provided as a screen unlock. Therefore, the relationship between the signal characteristics and the operation instructions may be established, and the relationship may be stored in the server, particularly, may be stored in a form of a corresponding relation table.

Alternatively, signal characteristics corresponding to any operations and/or circumstances may be stored in the server depending on demands. The pre-stored signal characteristics may include but not be limited to one or more of following signal characteristics: a signal characteristic of the terminal being clicked, a signal characteristic of the terminal being continuously clicked, a signal characteristic of the terminal in a reciprocating movement.

The continuous click may be a double click. The terminal in a reciprocating movement may be considered as a state of the mobile terminal being shaken by the user.

Alternatively, an operation instruction corresponding to a signal characteristic may be set by the server depending on demands. The operation instructions may include but not be limited to one or more of following operation instructions: an operation instruction of screen unlock, an operation instruction of answering a call, an operation instruction of starting a camera function.

Alternatively, for a case of detecting the electrical signal generated from the signal input line of the audio output device while the audio output device in the local terminal is outputting an audio, accordingly, in step 102, the first signal characteristic may be a signal characteristic of the terminal in a close circumstance, and the first operation instruction may be an operation instruction of increasing a volume and/or increasing a ringing strength.

In implementation, the signal characteristic of the terminal in the close circumstance may be a signal variation characteristic of the electrical signal generated from the signal input line of the audio output device with respect to the output signal transmitted to the audio output device from the mobile terminal, and the signal variation characteristic is a signal characteristic of the mobile terminal in the close circumstance, such as in a bag or a pocket. if the detected electrical signal meets the signal variation characteristic, it may be determined that the mobile terminal is currently in the close circumstance. At the moment, if there is an incoming call, it is possible that a ringing of the mobile terminal cannot be discovered by the user, and therefore the operation instruction to be triggered may be set as an operation instruction of increasing the volume and/or increasing the ringing strength in this case.

In step 103, the first operation instruction is executed.

In implementation, different operation instructions may be triggered according to different signal characteristics. For example, the signal characteristic of the terminal being clicked is corresponding to the operation instruction of screen unlock, the signal characteristic of the terminal being continuously clicked is corresponding to the operation instruction of answering a call, the signal characteristic of the terminal in a reciprocating movement is corresponding to the operation instruction of starting a camera function, and the like. Once the operation instruction is triggered to be executed, the mobile terminal may perform the corresponding operation.

In the aspects of the present disclosure, the electrical signal generated from the signal input line of the audio output device in the local terminal is detected, when the detected electrical signal meets the first signal characteristic of the pre-stored signal characteristics, the first operation instruction corresponding to the first signal characteristic is determined according to the relationship between the pre-stored signal characteristics and the operation instructions, and the first operation instruction is executed. In this way, an execution of a corresponding operation instruction may be triggered based on a characteristic of the electrical signal generated from the signal input line of the audio output device caused by a user operation or a state of the terminal. Thus, whether or not the screen is in a displaying state, the execution of the operation instruction may be triggered. Moreover, varied and abundant approaches for triggering the execution of the operation instruction are provided besides physical keys, which may increase a flexibility of triggering the execution of the operation instruction.

Aspect Three

Figure 3:
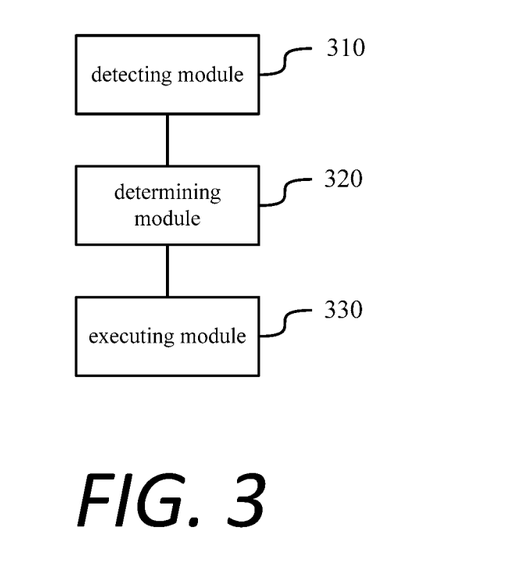
FIG. 3 is a schematic diagram of an apparatus for triggering an execution of an operation instruction, according to an exemplary aspect of the present disclosure.

Based on the same technical spirit, the aspect of the present disclosure further provides an apparatus for triggering an execution of an operation instruction. As shown in FIG. 3, the apparatus includes: a detecting module 310, a determining module 320 and an executing module 330.

The detecting module 310 is configured to detect an electrical signal generated from a signal input line of an audio output device in a local terminal.

The determining module 320 is configured to determine a first operation instruction corresponding to a first signal characteristic according to a relationship between pre-stored signal characteristics and operation instructions, when the detected electrical signal meets the first signal characteristic of the pre-stored signal characteristics.

The executing module 330 is configured to execute the first operation instruction.

Alternatively, the detecting module 310 is configured to detect the electrical signal generated from the signal input line of the audio output device while the audio output device in the local terminal is outputting an audio; the first signal characteristic includes a signal characteristic of the terminal in a close circumstance; the first operation instruction includes an operation instruction of increasing a volume and/or increasing a ringing strength.

Alternatively, the pre-stored signal characteristics include one or more of following signal characteristics: a signal characteristic of the terminal being clicked; a signal characteristic of the terminal being continuously clicked; a signal characteristic of the terminal in a reciprocating movement.

Alternatively, the relationship between the signal characteristics and the operation instructions includes one or more of following operation instructions: an operation instruction of screen unlock; an operation instruction of answering a call; an operation instruction of starting a camera function.

Alternatively, the detecting module 310 is further configured to detect a voltage signal and a current signal generated from the signal input line of the audio output device in the local terminal.

In the aspects of the present disclosure, the electrical signal generated from the signal input line of the audio output device in the local terminal is detected, when the detected electrical signal meets the first signal characteristic of the pre-stored signal characteristics, the first operation instruction corresponding to the first signal characteristic is determined according to the relationship between the pre-stored signal characteristics and the operation instructions, and the first operation instruction is executed. In this way, an execution of a corresponding operation instruction may be triggered based on a characteristic of the electrical signal generated from the signal input line of the audio output device caused by a user operation or a state of the terminal. Thus, whether or not the screen is in a displaying state, the execution of the operation instruction may be triggered. Moreover, varied and abundant approaches for triggering the execution of the operation instruction are provided besides physical keys, which may increase a flexibility of triggering the execution of the operation instruction.

Aspect Four

Figure 4:
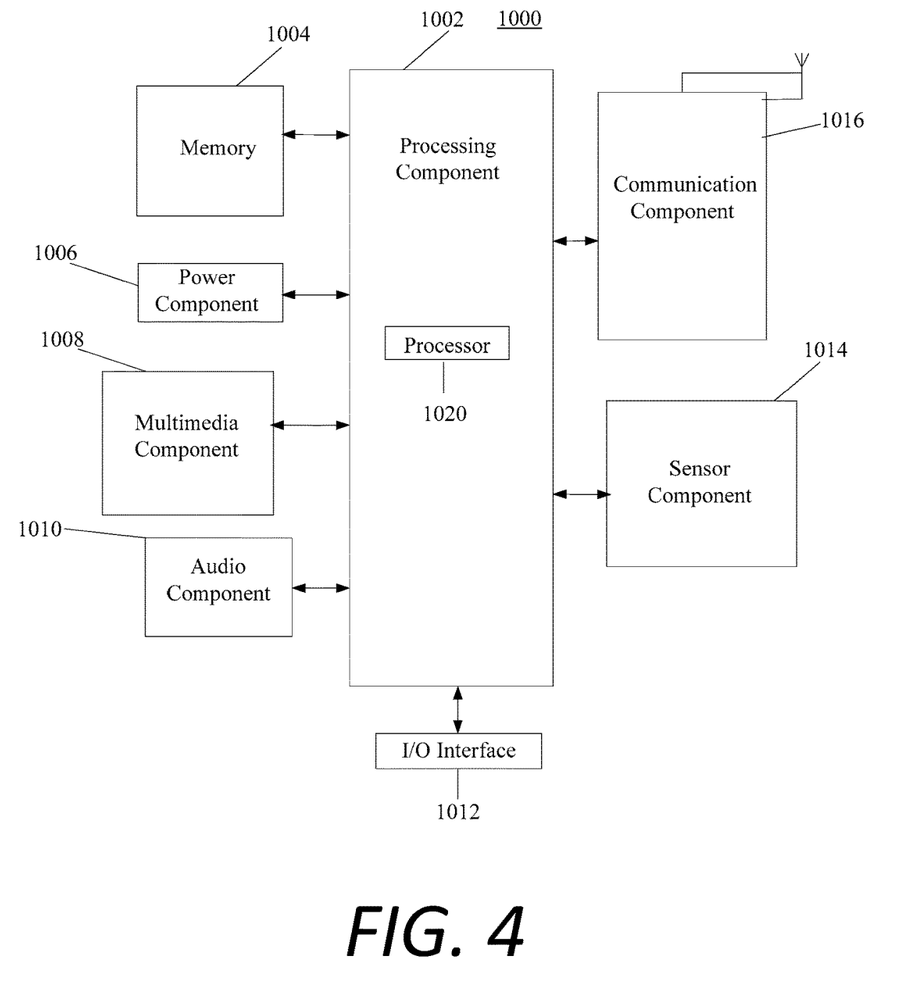
FIG. 4 is a schematic diagram of a terminal, according to an exemplary aspect of the present disclosure.

The aspect of the present disclosure further shows a schematic diagram of a terminal. The terminal may be a mobile phone, a tablet computer, etc.

Referring to FIG. 4, the terminal 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the terminal 1000. Examples of such data include instructions for any applications or methods operated on the terminal 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the terminal 1000. The power component 1006 may include a power management system, one or more power sources, and any other components associated with the generation, management, and distribution of power in the terminal 1000.

The multimedia component 1008 includes a screen providing an output interface between the terminal 1000 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 1008 includes a front camera and/or a rear camera. The front camera and/or the rear camera may receive an external multimedia datum while the terminal 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the terminal 1000 is in an operation mode, such as a call mode, a recording mode, and a voice recognition mode. The received audio signal may be further stored in the memory 1004 or transmitted via the communication component 1016. In some aspects, the audio component 1010 further includes a speaker to output audio signals.

The I/O interface 1012 provides an interface between the processing component 1002 and peripheral interface modules, such as a keyboard, a click wheel, buttons, and the like.

The buttons may include, but are not limited to, a home button, a volume button, a starting button, and a locking button.

The sensor component 1014 includes one or more sensors to provide status assessments of various aspects of the terminal 1000. For instance, the sensor component 1014 may detect an open/closed status of the terminal 1000, relative positioning of components, e.g., the display and the keypad, of the terminal 1000, a change in position of the terminal 1000 or a component of the terminal 1000, a presence or absence of user contact with the terminal 1000, an orientation or an acceleration/deceleration of the terminal 1000, and a change in temperature of the terminal 1000. The sensor component 1014 may include a proximity sensor configured to detect the presence of nearby objects without any physical contact. The sensor component 1014 may also include a light sensor, such as a CMOS or CCD image sensor, for use in imaging applications. In some aspects, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the terminal 1000 and other devices. The terminal 1000 can access a wireless network based on a communication standard, such as WiFi, 2G, or 3G, or a combination thereof. In one exemplary aspect, the communication component 1016 receives a broadcast signal or broadcast associated information from an external broadcast management system via a broadcast channel. In one exemplary aspect, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the terminal 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, a first charging management device, a second charging management device, or other electronic components, for performing the above described methods.

In exemplary aspects, there is also provided a non-transitory computer-readable storage medium including instructions, such as included in the memory 1004, executable by the processor 1020 in the terminal 1000, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium is provided, having stored therein instructions that, when executed by a processor of a terminal, causes the terminal to perform a method for triggering an execution of an operation instruction. The method includes following steps:
  an electrical signal generated from a signal input line of an audio output device in a local terminal is detected;
  a first operation instruction corresponding to a first signal characteristic is determined according to a relationship between pre-stored signal characteristics and operation instructions, when the detected electrical signal meets the first signal characteristic of the pre-stored signal characteristics;
  the first operation instruction is executed.

Alternatively, detecting an electrical signal generated from a signal input line of an audio output device in a local terminal includes: detecting the electrical signal generated from the signal input line of the audio output device while the audio output device in the local terminal is outputting an audio; the first signal characteristic includes a signal characteristic of the terminal in a close circumstance; the first operation instruction includes an operation instruction of increasing a volume and/or increasing a ringing strength.

Alternatively, the pre-stored signal characteristics include one or more of following signal characteristics: a signal characteristic of the terminal being clicked; a signal characteristic of the terminal being continuously clicked; a signal characteristic of the terminal in a reciprocating movement.

Alternatively, the relationship between the signal characteristics and the operation instructions includes one or more of following operation instructions: an operation instruction of screen unlock; an operation instruction of answering a call; an operation instruction of starting a camera function.

Alternatively, detecting an electrical signal generated from a signal input line of an audio output device in a local terminal includes: detecting a voltage signal and a current signal generated from the signal input line of the audio output device in the local terminal.

In the aspects of the present disclosure, the electrical signal generated from the signal input line of the audio output device in the local terminal is detected, when the detected electrical signal meets the first signal characteristic of the pre-stored signal characteristics, the first operation instruction corresponding to the first signal characteristic is determined according to the relationship between the pre-stored signal characteristics and the operation instructions, and the first operation instruction is executed. In this way, an execution of a corresponding operation instruction may be triggered based on a characteristic of the electrical signal generated from the signal input line of the audio output device caused by a user operation or a state of the terminal. Thus, whether or not the screen is in a displaying state, the execution of the operation instruction may be triggered. Moreover, varied and abundant approaches for triggering the execution of the operation instruction are provided besides physical keys, which may increase a flexibility of triggering the execution of the operation instruction.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method comprising:
   detecting a first electrical signal generated on a signal line connected to a speaker of a device by a feedback signal input terminal of a power amplifier connected to the signal line, wherein the first electrical signal is detected while the speaker is outputting an audio,
   wherein the power amplifier includes a positive output terminal, a negative output terminal, the feedback signal input terminal, and a feedback signal output terminal, wherein the positive output terminal and the negative output terminal are configured to operate the speaker;
   amplifying the detected first electrical signal by the power amplifier;
   converting the amplified first electrical signal by an analog-to-digital converter to a first digital signal;
   outputting the first digital signal by the feedback signal output terminal of the power amplifier;
   determining that the first digital signal includes a first signal characteristic that corresponds to one of a plurality of signal characteristics, wherein each one of the plurality of signal characteristics corresponds to a respective one of a plurality of operations, and wherein the first signal characteristic includes a signal characteristic associated with the device being in a small confined space; and
   executing a first operation from the plurality of operations based on the first signal characteristic, wherein the first operation includes an operation of increasing a volume of the speaker or a volume associated with a ringtone.

2. The method of claim 1, wherein the plurality of signal characteristics includes at least one of (i) a signal characteristic of the device being clicked or tapped, (ii) a signal characteristic of the device being continuously clicked or tapped, and (iii) a signal characteristic of the device being moved in a reciprocating manner.

3. The method of claim 1, wherein the plurality of operations includes at least one of (i) an operation of screen unlock, (ii) an operation of answering a call, and (iii) an operation of starting a camera function.

4. The method of claim 1, wherein detecting the first electrical signal includes:
   detecting a voltage signal and a current signal generated on the signal line.

5. An apparatus comprising:
   a speaker;
   a power amplifier connected to a signal line connected to the speaker, wherein the power amplifier includes a positive output terminal, a negative output terminal, a feedback signal input terminal, and a feedback signal output terminal, wherein the positive output terminal and the negative output terminal are configured to operate the speaker;
   an analog-to-digital converter;
   a processor; and
   a memory for storing instructions executable by the processor,
   wherein the power amplifier is configured to:
      detect a first electrical signal generated on the signal line connected to the speaker by the feedback signal input terminal, wherein the first electrical signal is detected while the speaker is outputting an audio; and
      amplify the detected first electrical signal,
   wherein the analog-to-digital converter is configured to convert the amplified first electrical signal to a first digital signal,
   wherein the power amplifier is further configured to output the first digital signal by the feedback signal output terminal,
   wherein the processor is configured to:
      determine that the first digital signal includes a first signal characteristic that corresponds to one of a plurality of signal characteristics, wherein each one of the plurality of signal characteristics corresponds to a respective one of a plurality of operations, and wherein the first signal characteristic includes a signal characteristic associated with the device being in a small confined space; and
      execute a first operation from the plurality of operations based on the first signal characteristic, wherein the first operation includes an operation of increasing a volume of the speaker or a volume associated with a ringtone.

6. The apparatus of claim 5, wherein the plurality of signal characteristics includes at least one of (i) a signal characteristic of a click, (ii) a signal characteristic of a continuous number of clicks or taps, (iii) a signal characteristic of a reciprocating movement.

7. The apparatus of claim 5, wherein the plurality of operations includes at least one of (i) an operation of screen unlock, (ii) an operation of answering a call, and (iii) an operation of starting a camera function.

8. The apparatus of claim 5, wherein the processor is configured to detect the first electrical signal by detecting a voltage signal and a current signal generated on the signal line.

9. A non-transitory computer-readable storage medium having stored therein instructions that, when executed by a processor of a device, cause the processor to perform a method comprising:
   detecting a first electrical signal generated on a signal line connected to a speaker of the device by a feedback signal input terminal of a power amplifier connected to the signal line, wherein the first electrical signal is detected while the speaker is outputting an audio,
   wherein the power amplifier includes a positive output terminal, a negative output terminal, the feedback signal input terminal, and a feedback signal output terminal, wherein the positive output terminal and the negative output terminal are configured to operate the speaker;
   amplifying the detected first electrical signal by the power amplifier;
   converting the amplified first electrical signal by an analog-to-digital converter to a first digital signal;
   outputting the first digital signal by the feedback signal output terminal of the power amplifier;
   determining that the first digital signal includes a first signal characteristic that corresponds to one of a plurality of signal characteristics, wherein each one of the plurality of signal characteristics corresponds to a respective one of a plurality of operations, and wherein the first signal characteristic includes a signal characteristic associated with the device being in a small confined space; and executing a first operation from the plurality of operations based on the first signal characteristic, wherein the first operation includes an operation of increasing a volume of the speaker or a volume associated with a ringtone.

* * * * *